(12) United States Patent
Asahi

(10) Patent No.: US 12,580,482 B2
(45) Date of Patent: Mar. 17, 2026

(54) SWITCHING POWER SUPPLY DEVICE

(71) Applicant: DENSO CORPORATION, Kariya-city (JP)

(72) Inventor: Takashi Asahi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 203 days.

(21) Appl. No.: 18/597,294

(22) Filed: Mar. 6, 2024

(65) Prior Publication Data

US 2024/0213879 A1    Jun. 27, 2024

Related U.S. Application Data

(63) Continuation of application No. PCT/JP2022/035913, filed on Sep. 27, 2022.

(30) Foreign Application Priority Data

Oct. 21, 2021    (JP) ................................. 2021-172432

(51) Int. Cl.
H02M 3/156 (2006.01)

(52) U.S. Cl.
CPC .................................. H02M 3/156 (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205;

G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135;
(Continued)

(56) References Cited

U.S. PATENT DOCUMENTS 8,570,019 B2 * 10/2013 Nakamura ............ H02M 3/156
                                                              323/284
9,013,164 B1 * 4/2015 Lee ....................... H02M 3/156
                                                              323/285
(Continued)

FOREIGN PATENT DOCUMENTS

JP           2016-091199 A       5/2016

*Primary Examiner* — Jeffrey A Gblende
(74) *Attorney, Agent, or Firm* — Posz Law Group, PLC

(57) ABSTRACT

A switching power supply device includes an on-timing generation circuit that generates an on-timing signal for turning on a switching element. The on-timing generation circuit includes: an error amplifier that outputs an error amplification signal obtained by amplifying a difference between a feedback voltage and a reference voltage; a common voltage generation unit that generates a common voltage; a ripple signal generation unit that generates a forward phase ripple signal and a reverse phase ripple signal; and a comparator that generates the on-timing signal by comparing a pair of differential signals generated based on the error amplification signal, the common voltage, the forward phase ripple signal and the reverse phase ripple signal.

6 Claims, 12 Drawing Sheets

(58) Field of Classification Search
CPC ........ H02M 3/145; H02M 3/15; H02M 3/155;
H02M 3/156; H02M 3/157; H02M 3/158;
H02M 1/346; H02M 3/1588; H02M
2003/1566; H02M 3/1582; H02M 3/1584;
H02M 2003/1557; H02M 1/0032; H02M
1/4225; H02M 7/217; H02M 1/0025;
H02M 1/0045; H02M 1/0009; H02M
1/08; H02M 1/088; H02M 1/0048; H05B
39/048; B23K 11/24; H04B 2215/069
See application file for complete search history.

(56) References Cited

U.S. PATENT DOCUMENTS

| | | | |
|---|---|---|---|
| 9,608,521 B2 * | 3/2017 | Shiina ................... | H02M 3/157 |
| 2014/0340061 A1 | 11/2014 | Ueno | |
| 2021/0083574 A1 * | 3/2021 | Namekawa ........... | H02M 3/156 |

* cited by examiner

FIG. 14

SWITCHING POWER SUPPLY DEVICE

CROSS REFERENCE TO RELATED APPLICATION

The present application is a continuation application of International Patent Application No. PCT/JP2022/035913 filed on Sep. 27, 2022, which designated the U.S. and claims the benefit of priority from Japanese Patent Application No. 2021-172432 filed on Oct. 21, 2021. The entire disclosures of all of the above applications are incorporated herein by reference.

TECHNICAL FIELD

The present disclosure relates to a switching power supply device that converts an input voltage into a desired output voltage by pulse width modulation controlling a drive of a switching element with a fixed on-state time.

BACKGROUND

Conventionally, there is a switching power supply device of a COT control system in which the driving of a switching element is controlled by pulse width modulation with a fixed on-state time. In this disclosure, the pulse width modulation may be referred to as PWM, which is an abbreviation thereof. Also, the COT is an abbreviation for Constant On Time. In the switching power supply device of the COT control system, on/off control of the switching element is performed using the ripple voltage appearing in the output voltage.

In the COT control type switching power supply, when a ceramic capacitor with a relatively small equivalent series resistance is used as a capacitor for smoothing the output voltage, a sufficient ripple voltage may not be obtained, and the control of the output voltage may become unstable. In this disclosure, the equivalent series resistance may be referred to as ESR, which is an abbreviation thereof. As a technique for solving such difficulties, there is a technique according to a conceivable technique. That is, the conceivable technique teaches a switching power supply device that provides a pseudo-ripple injection method that generates a pseudo-ripple voltage using an RC filter and injects the pseudo-ripple voltage into the feedback voltage of the output voltage.

SUMMARY

According to an example, a switching power supply device may include an on-timing generation circuit that generates an on-timing signal for turning on a switching element. The on-timing generation circuit may include: an error amplifier that outputs an error amplification signal obtained by amplifying a difference between a feedback voltage and a reference voltage; a common voltage generation unit that generates a common voltage; a ripple signal generation unit that generates a forward phase ripple signal and a reverse phase ripple signal; and a comparator that generates the on-timing signal by comparing a pair of differential signals generated based on the error amplification signal, the common voltage, the forward phase ripple signal and the reverse phase ripple signal.

BRIEF DESCRIPTION OF THE DRAWINGS

The above and other objects, features and advantages of the present disclosure will become more apparent from the following detailed description made with reference to the accompanying drawings. In the drawings:

FIG. 14 is a third diagram schematically showing a modification of the power stage.

DETAILED DESCRIPTION

Figure 1:
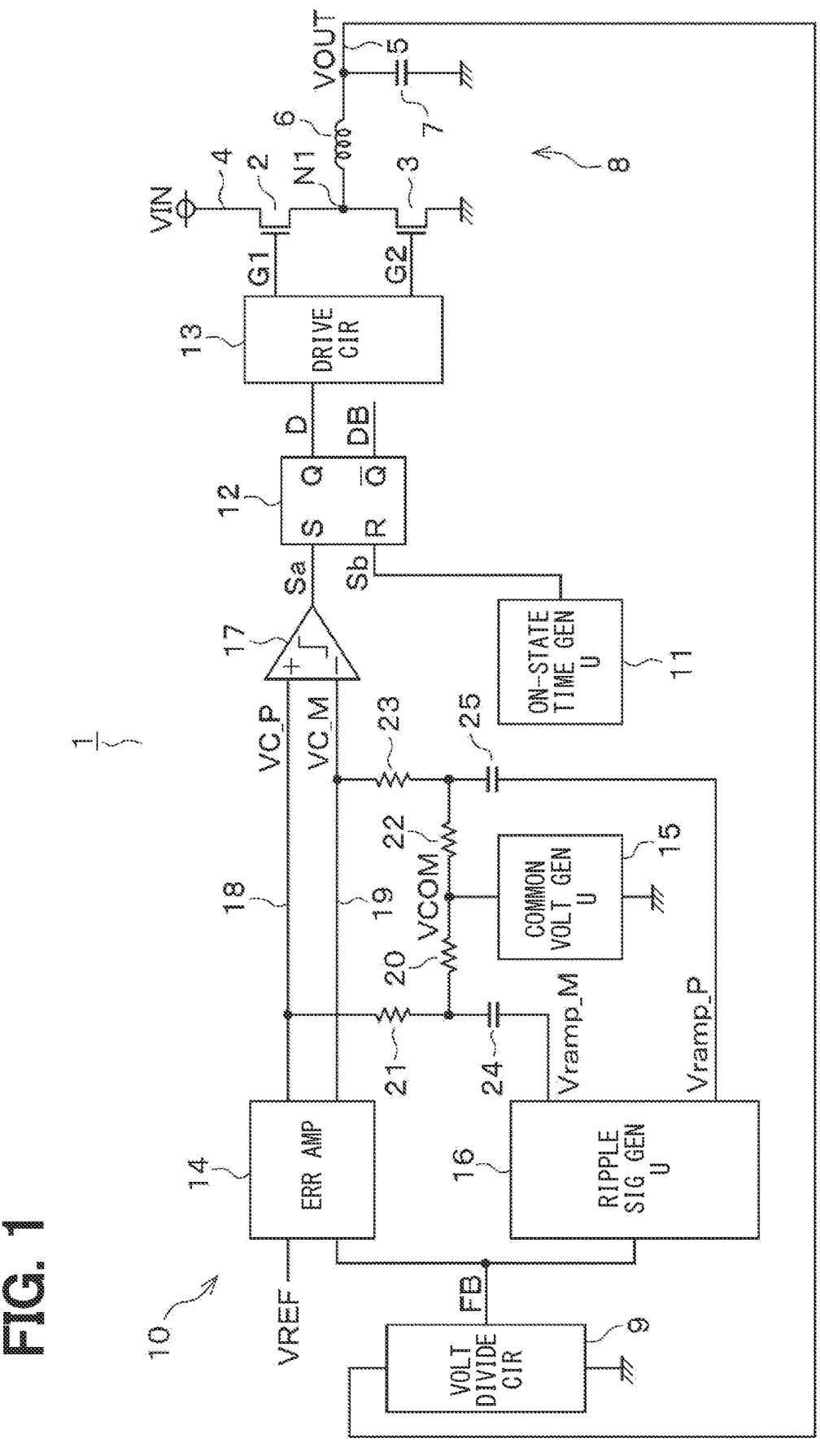
FIG. 1 is a diagram schematically showing the configuration of a switching power supply device according to a first embodiment.

In each of the conceivable techniques described above, when the input voltage is reduced and becomes high duty, the signal amplitude of the ripple voltage or the pseudo ripple voltage becomes small, and there is a concern that the S/N ratio of the feedback signal will deteriorate. If an erroneous detection occurs due to the influence of noise due to deterioration of the S/N of the feedback signal, the ON timing, which is the timing to turn on the switching element, may not be not generated properly so that the PWM waveform become unstable, and the control of the output voltage may become unstable.

Further, in each of the conceivable techniques described above, it may provide a possibility to improve the S/N ratio by amplifying the signal amplitude of the ripple voltage or the pseudo-ripple voltage. However, in this case, the signal amplitude becomes too large in a case where the ripple voltage or the pseudo-ripple voltage is sufficiently large, so that it may cause exceeding the input dynamic range of the subsequent circuit. Thus, the upper limit of the input voltage range may be limited. These difficulties become even more apparent in applications where the range of input voltage is relatively wide, such as applications in which the voltage of an in-vehicle battery mounted on a vehicle is used as the input voltage of a switching power supply device, for example.

The present embodiments provide a switching power supply device capable of stabilizing the control of the output voltage even when the input voltage is decreased.

In one aspect of the present embodiments, a switching power supply device includes a switching element and converts an input voltage into a desired output voltage by pulse-width modulation controlling a drive of the switching element with a fixed on-state time. The switching power supply device further includes an on-timing generation circuit, an on-state time generation circuit, a drive signal generation circuit, and a drive circuit. The on-timing generation circuit generates an on-timing signal corresponding to the on-timing at which the switching element is turned on. The on-state time generation circuit generates an on-state time signal corresponding to the on-state time, during which the switching element is in an on state. The drive signal generation circuit generates a drive signal based on the on-state time signal and the on-state time signal. The drive circuit drives the switching element based on the drive signal.

In the above configuration, the on-timing generation circuit includes an error amplifier, a common voltage generation unit, a ripple signal generation unit, and a first comparator. The error amplifier has a differential output type configuration that outputs an error amplification signal obtained by amplifying the error between the feedback voltage corresponding to the output voltage and the reference voltage. The common voltage generation unit generates a common voltage. The ripple signal generation unit generates a forward phase ripple signal obtained by converting a voltage corresponding to a ripple voltage included in the output voltage into a forward phase and a reverse phase ripple signal obtained by converting a voltage corresponding to the ripple voltage into a reverse phase. The first comparator generates an on-timing signal by comparing a pair of differential signals generated based on the output signal, a common voltage, a forward phase ripple signal and a reverse phase ripple signal of the error amplifier.

According to the above configuration, the first comparator compares a pair of differential signals, which are differential signals generated based on the forward phase ripple signal and the reverse phase ripple signal corresponding to the ripple voltage to generate a timing signal. By doing so, it is possible to improve resistance to common mode noise and power supply noise, that is, to greatly improve the S/N ratio. Therefore, according to the above configuration, it is possible to obtain an excellent effect that the control of the output voltage can be stabilized even when the input voltage is reduced. Therefore, the switching power supply device having the above configuration can be applied to applications in which the input voltage range is relatively wide, such as applications in which the voltage of an in-vehicle battery mounted on a vehicle is used as the input voltage.

Hereinafter, multiple embodiments will be described with reference to the drawings. In each embodiment, the substantially same components are denoted by the same reference numerals and description thereof will be omitted.

First Embodiment

The first embodiment of the present disclosure is described with reference to FIGS. 1 to 6.
<Overall Configuration>
As shown in FIG. 1, the switching power supply device 1 of the present embodiment is a COT control type switching power supply device that PWM-controls the driving of the switching elements 2 and 3 with a fixed on-state time. All or a part of the switching power supply device 1 is configured as a semiconductor integrated circuit such as an ASIC. ASIC is an abbreviation for Application Specific Integrated Circuit.

The switching elements 2 and 3 are, for example, MOS transistors. One main terminal of the switching element 2 is connected to a power supply line 4 to which the input voltage VIN is applied, and the other main terminal thereof is connected to the node N1. One main terminal of the switching element 3 is connected to the node N1, and the other main terminal thereof is connected to the ground to which the reference potential of the circuit is applied. An inductor 6 is connected between the node N1 and the power supply line 5 for outputting the output voltage VOUT. A capacitor 7 for smoothing the output voltage VOUT is connected between the power supply line 5 and the ground.

A power stage 8 of the switching power supply device 1 is provided by the switching elements 2 and 3, the inductor 6 and the capacitor 7. The switching power supply 1 is a synchronous rectification step-down type switching power supply device that converts an input voltage VIN into a desired output voltage VOUT by complementarily turning on and off two switching elements 2 and 3 of the power stage 8. The switching power supply device 1 is used, for example, as a power supply for an electronic control device mounted on a vehicle such as an automobile. In this case, the input voltage VIN is the voltage directly supplied from the in-vehicle battery mounted on the vehicle.

The switching power supply device 1 includes a voltage divide circuit 9, an on-timing generation circuit 10, an on-state time generation circuit 11, a driving signal generation circuit 12, a drive circuit 13, and the like. The voltage divide circuit 9 is configured by connecting a plurality of resistors in series between the power supply line 5 and the ground. The voltage divide circuit 9 outputs a feedback voltage FB according to the output voltage VOUT obtained by dividing the output voltage VOUT by a plurality of resistors.

The on-timing generation circuit 10 generates an on-timing signal Sa corresponding to the on-timing at which the switching elements 2 and 2 are turned on. The on-timing generation circuit 10 includes a differential output type error amplifier 14, a common voltage generation unit 15, a ripple signal generation unit 16, a comparator 17, and the like. The error amplifier 14 is configured as a fully differential error amplifier, and has one input terminal to which the feedback voltage FB is input and the other input terminal to which the reference voltage VREF is input. The reference voltage VREF is a voltage corresponding to the target value of the output voltage VOUT.

The error amplifier 14 outputs an error amplification signal obtained by amplifying the error between the feedback voltage FB and the reference voltage VREF from its non-inversion output terminal and inversion output terminal. The error amplification signal output from the error amplifier 14 is a signal having substantially only a direct current component from which a high band component have been removed. The non-inversion output terminal and the inversion output terminal of the error amplifier 14 are connected to signal lines 18 and 19, respectively. The common voltage generation unit 15 generates a common voltage VCOM similar to that for controlling the common mode level of the output of the error amplifier 14.

5

Figure 5:
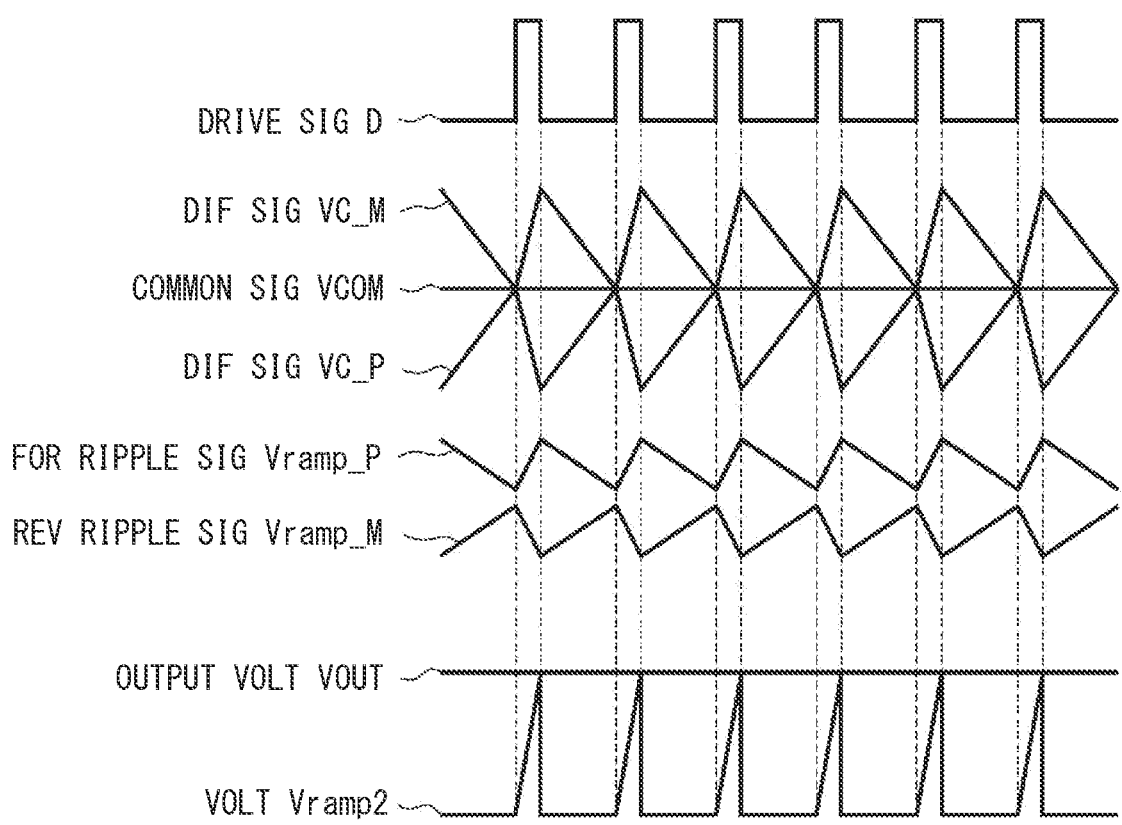
FIG. 5 is a timing chart schematically showing waveforms of signals and voltages of respective parts during low on-duty according to the first embodiment.
Figure 6:
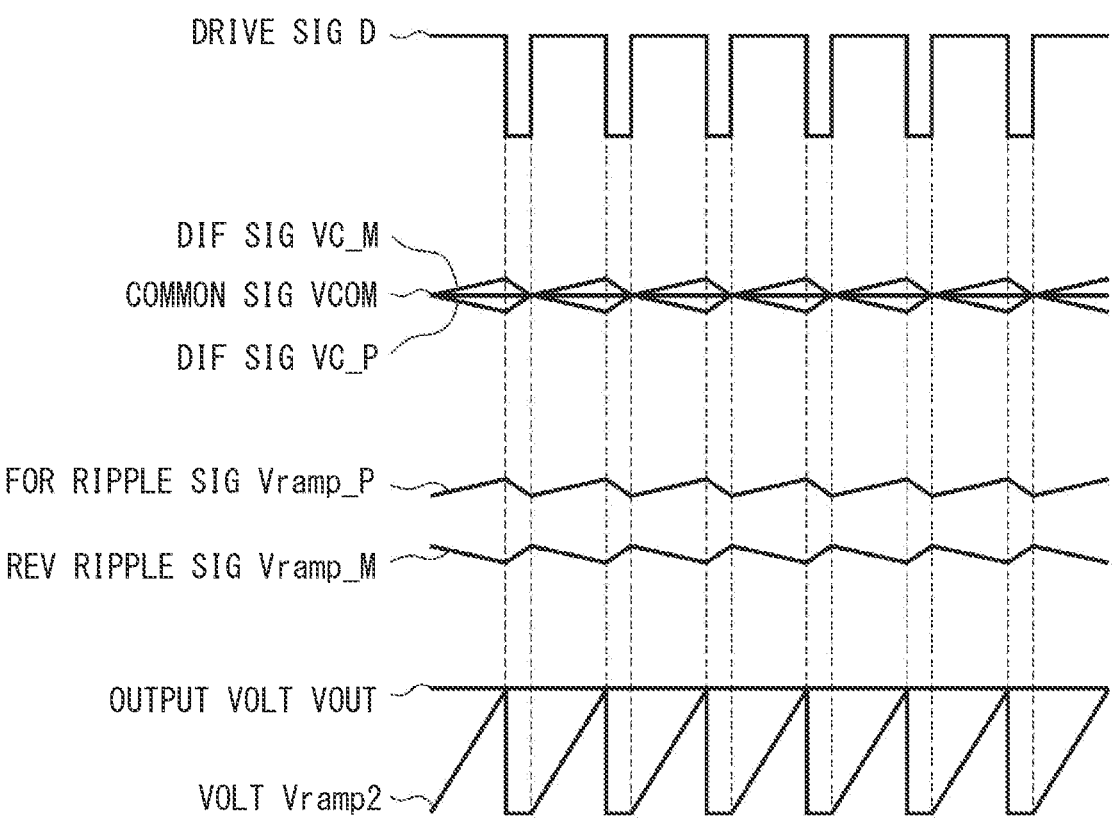
FIG. 6 is a timing chart schematically showing waveforms of signals and voltages of respective parts during high on-duty according to the first embodiment.

The feedback voltage FB is input to the ripple signal generation unit 16. The ripple signal generation unit 16 generates a forward phase ripple signal Vramp_P and a reverse phase ripple signal Vramp_M based on the feedback voltage FB. The forward phase ripple signal Vramp_P is a signal obtained by converting a ripple component included in the output voltage VOUT, that is, a voltage corresponding to the ripple voltage into a positive phase signal, and has a ramp waveform as shown in FIGS. 5 and 6, for example. The reverse phase ripple signal Vramp_M is a signal obtained by converting the voltage corresponding to the ripple voltage into a reverse phase signal, and has a ramp waveform as shown in FIGS. 5 and 6, for example.

In the above configuration, the output terminal of the common voltage generation unit 15 is connected to the signal line 18 via resistors 20 and 21 and to the signal line 19 via resistors 22 and 23. In the above configuration, the output terminal of the ripple signal generation unit 16 for the reverse phase ripple signal Vramp_M is connected to the signal line 18 via the capacitor 24 and the resistor 21. Further, in the above configuration, the output terminal of the forward phase ripple signal Vramp_P of the ripple signal generation unit 16 is connected to the signal line 19 via the capacitor 25 and the resistor 23.

With this configuration, the on-timing generation circuit 10 generates a pair of differential signals VC_P and VC_M which are obtained by AC-coupling and injecting the forward phase ripple signal Vramp_P and the reverse phase ripple signal Vramp_M to a signal obtained by biasing the error amplification signal, which is the output signal of the error amplifier 14, with the common voltage VCOM. In other words, the on-timing generation circuit 10 generates a pair of differential signals VC_P and VC_M based on the output signal of the error amplifier 14, the common voltage VCOM, the forward phase ripple signal Vramp_P, and the reverse phase ripple signal Vramp_M.

The differential signals VC_P and VC_M are signals as shown in FIGS. 5 and 6, for example. That is, the differential signal VC_P is a ramp waveform signal that changes in the same manner as the reverse phase ripple signal Vramp_M. Further, the differential signal VC_M is a ramp waveform signal that changes in the same manner as the forward phase ripple signal Vramp_P. In this case, the differential signals VC_P and VC_M have vertically symmetrical waveforms with respect to the common voltage VCOM as a center. The differential signals VC_P and VC_M are applied to the subsequent comparator 17 via the signal lines 18 and 19, respectively.

A differential signal VC_P is input to the non-inversion input terminal of the comparator 17, and a differential signal VC_M is input to its inversion input terminal. The on-timing generation circuit 10 outputs the output signal of the comparator 17 as the on-timing signal Sa. That is, the comparator 17 generates the on-timing signal Sa by comparing the pair of differential signals VC_P and VC_M, and functions as a first comparator.

The on-state time generation circuit 11 generates and outputs an on-state time signal Sb corresponding to the on-state time, which is the time during which the switching elements 2 and 3 are turned on. The drive signal generation circuit 12 generates a drive signal based on the on-timing signal Sa output from the on-timing generation circuit 10 and the on-state time signal Sb output from the on-state time generation circuit 11. In this case, the drive signal generation circuit 12 is configured as an SR latch circuit.

A set terminal S of the drive signal generation circuit 12 is supplied with an on-timing signal Sa, and a reset terminal R thereof is supplied with an on-state time signal Sb. In this case, the non-inversion output signal D, which is a binary signal output from the non-inversion output terminal Q of the drive signal generation circuit 12, becomes the drive signal. Therefore, in the following description, the drive signal will be denoted by the same symbol D as the non-inversion output signal. An inversion output signal DB, which is a binary signal output from the inversion output terminal Q-bar of the drive signal generation circuit 12, is provided to the on-state time generation circuit 11. Here, in FIG. 1 and the like, the inversion output terminal of the SR latch circuit is indicated by adding "-" above the symbol Q.

The drive circuit 13 drives the switching elements 2 and 3 based on the drive signal D given from the drive signal generation circuit 12. The drive circuit 13 generates gate signals G1 and G2 by level-shifting the drive signal D, and outputs the gate signals G1 and G2 to the gates of the switching elements 2 and 3, respectively. The switching elements 2 and 3 are driven based on gate signals G1 and G2, respectively. In this case, the drive circuit 13 generates and outputs a gate signal G1 that turns on the switching element 2 while the drive signal D is at high level and turns off the switching element 2 while the drive signal D is at low level.

<Specific Configuration of On-State Time Generation Circuit>

Figure 2:
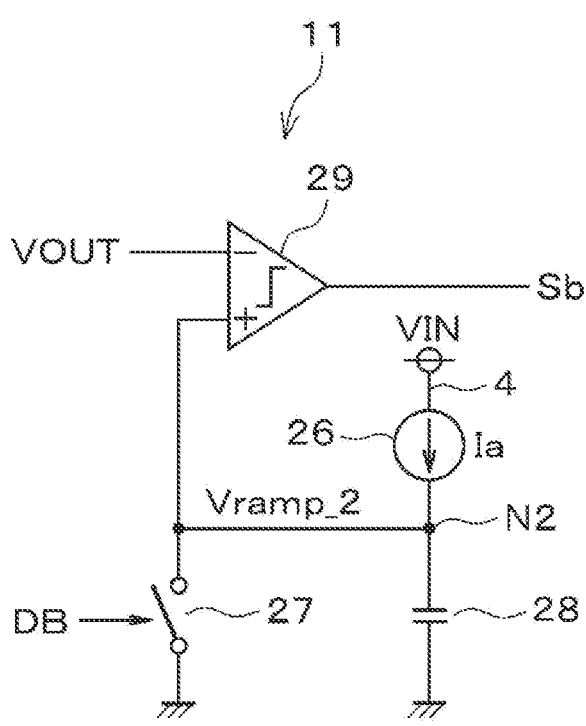
FIG. 2 is a diagram showing a specific configuration example of an on-state time generation circuit according to the first embodiment.

As a specific configuration of the on-state time generation circuit 11, a configuration shown in FIG. 2 can be adopted as an example. As shown in FIG. 2, the on-state time generation circuit 11 includes a current source 26, a switch 27, a capacitor 28 and a comparator 29. The current source 26 is connected between the power supply line 4 and the node N2, and outputs a current Ia toward the node N2, and the current Ia is a constant current that increases or decreases depending on the input voltage VIN, that is a constant current proportional to the input voltage VIN.

The switch 27 includes, for example, a MOS transistor, and is connected between the node N2 and the ground. A capacitor 28 is connected between terminals of the switch 27, that is, between the node N2 and the ground. The switch 27 is turned on and off according to the inversion output signal DB. Specifically, the switch 27 is turned on while the inversion output signal DB is at high level, and turned off while the inversion output signal DB is at low level.

According to such a configuration, the capacitor 28 is charged with the current Ia during the period when the drive signal D is at high level, that is, while the switching element 2 is turned on, and is discharged during the period when the drive signal D is at low level, that is, when the switching element 2 is turned off. Thus, the capacitor 28 functions as a capacitor charged by the current Ia proportional to the input voltage VIN. In this case, the switch 27 controls charging and discharging of the capacitor 28 based on the inversion output signal DB and the drive signal D as well.

The output voltage VOUT is input to the inversion input terminal of the comparator 29, and the voltage Vramp2, which is the terminal voltage of the capacitor 28, is input to the non-inversion input terminal. The voltage Vramp2 is a ramp waveform signal as shown in FIGS. 5 and 6, for example. With such a configuration, the output signal of the comparator 29 becomes a binary signal whose level is inverted at the timing when the voltage Vramp2 reaches the output voltage VOUT. The on-state time generation circuit 11 outputs the output signal of the comparator 29 as the on-state time signal Sb. That is, the comparator 29 generates the on-state time signal Sb by comparing the voltage Vramp2, which is the terminal voltage of the capacitor 28, and the output voltage VOUT, and functions as a second comparator.

<Specific Configuration of Ripple Signal Generation Unit>

Figure 3:
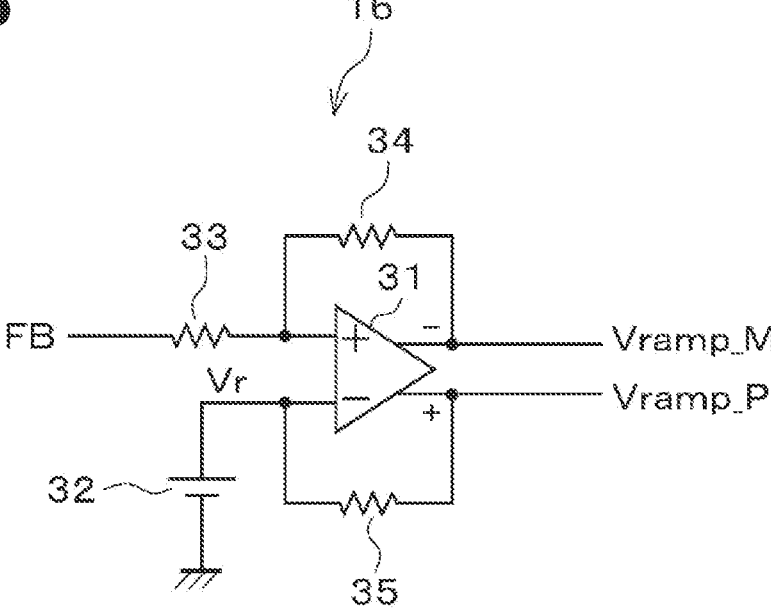
FIG. 3 is a diagram showing a specific configuration example of a ripple signal generation unit according to the first embodiment.

As a specific configuration of the ripple signal generation unit 16 of the on-timing generation circuit 10, for example, a configuration as shown in FIG. 3 can be adopted. As shown in FIG. 3, the ripple signal generation unit 16 includes a fully differential error amplifier 31, a voltage source 32 and resistors 33-35. A feedback voltage FB is input to the inversion input terminal of the error amplifier 31 via a resistor 33. A predetermined reference voltage Vr generated by the voltage source 32 is input to the non-inversion input terminal of the error amplifier 31.

A resistor 34 is connected between the non-inversion input terminal and the inversion output terminal of the error amplifier 31. A resistor 35 is connected between the inversion input terminal and the non-inversion output terminal of the error amplifier 31. According to such a configuration, the non-inversion output signal of the error amplifier 31 becomes the forward phase ripple signal Vramp_P, and the inversion output signal of the error amplifier 31 becomes the reverse phase ripple signal Vramp_M.

<Specific Configuration of Differential Output Type Error Amplifier>

Figure 4:
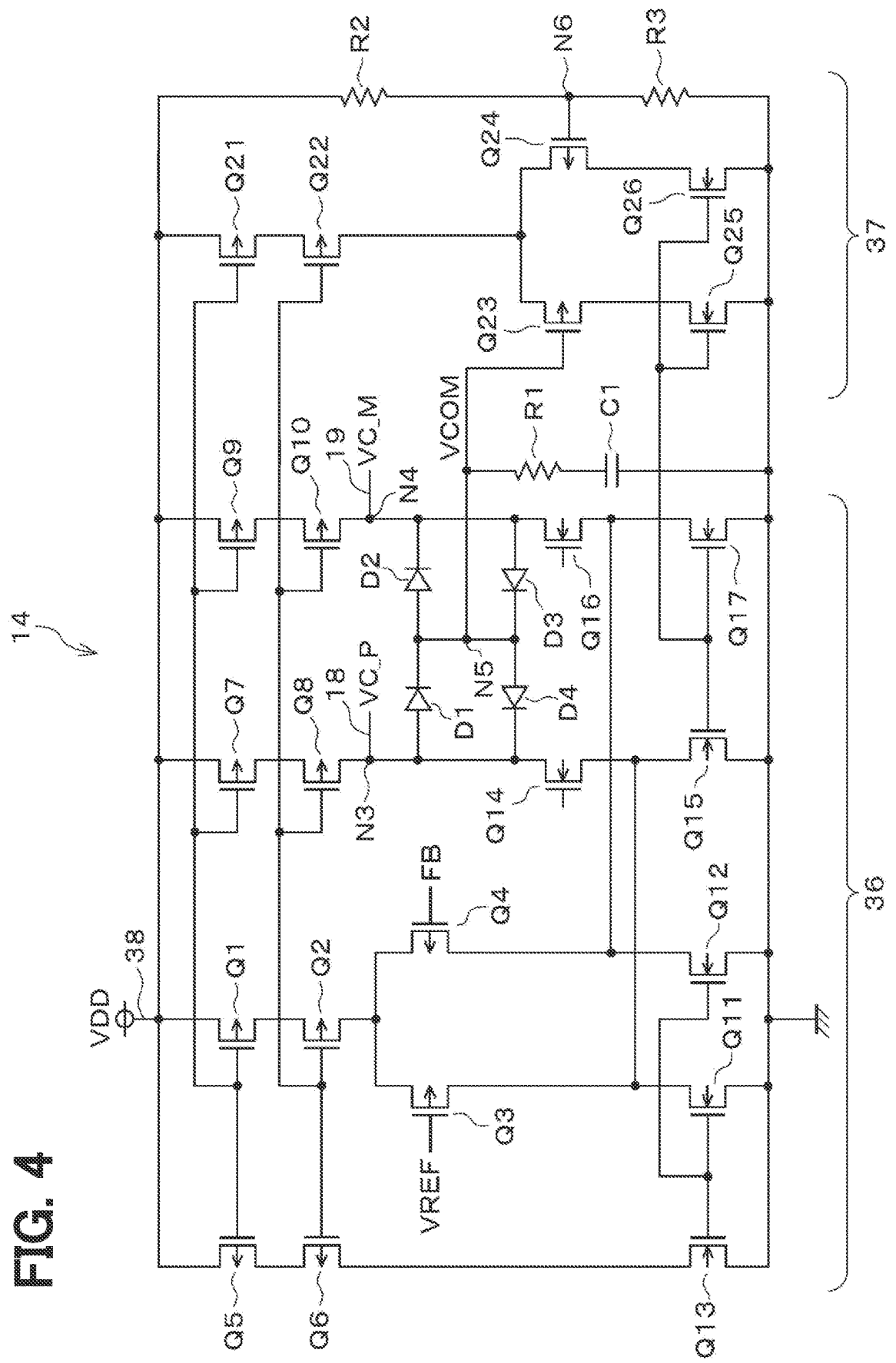
FIG. 4 is a diagram showing a specific configuration example of a differential output type error amplifier according to the first embodiment.

As a specific configuration of the error amplifier 14 of the on-timing generation circuit 10, for example, a configuration as shown in FIG. 4 can be adopted. As shown in FIG. 4, the error amplifier 14 is configured as a differential output type error amplifier using a common mode feedback function and including an error amplifier 36 and a common voltage generation unit 37.

The error amplifier 36 includes transistors Q1 to Q10 which are P-channel MOS transistors, transistors Q11 to Q17 which are N-channel MOS transistors, and diodes D1 to D4. The source of the transistor Q1 is connected to a power supply line 38 to which a power supply voltage VDD such as +5V is applied, and its drain is connected to the sources of the transistors Q3 and Q4 via the transistor Q2. A reference voltage VREF is applied to the gate of the transistor Q3, and a feedback voltage FB is applied to the gate of the transistor Q4.

The drain of transistor Q3 is connected to the ground through the transistor Q11. The drain of transistor Q4 is connected to the ground through the transistor Q12. The gates of transistors Q11 and Q12 are commonly connected. The source of transistor Q5 is connected to the power supply line 38, and its drain is grounded via the transistors Q6 and Q13. The gate of transistor Q5 is connected to the gate of transistor Q1, and the gate of transistor Q6 is connected to the gate of transistor Q2. The gate of transistor Q13 is connected to the gates of transistors Q11 and Q12.

The source of transistor Q7 is connected to the power supply line 38, and its drain is grounded through the transistors Q8, Q14 and Q15. The source of transistor Q9 is connected to the power supply line 38, and its drain is grounded via the transistors Q10, Q16 and Q17. Each of the gates of transistors Q7 and Q9 is connected to the gate of transistor Q1, and the gates of transistors Q8 and Q10 are connected to the gate of transistor Q2.

The source of transistor Q14 is connected to the drain of transistor Q3 and the source of transistor Q16 is connected to the drain of transistor Q4. The gates of transistors Q15 and Q17 are commonly connected. A node N3, which is an interconnection node of the transistors Q8 and Q14, corresponds to the non-inversion output terminal of the error amplifier 14 and is connected to the signal line 18. A node N4, which is an interconnection node of the transistors Q10 and Q16, corresponds to the inversion output terminal of the error amplifier 14 and is connected to the signal line 19.

The diode D1 has an anode connected to the node N3 and a cathode connected to the node N4 through the diode D2 in the forward direction. The diode D3 has an anode connected to the node N4 and a cathode connected to the node N3 through the diode D4 in the forward direction. The cathodes of diodes D1 and D3 are connected to the anodes of diodes D2 and D4, respectively. The node N5, which is the interconnection node of the diodes D1-D4, is connected to the ground through the resistor R1 and the capacitor C1.

The common voltage generation unit 37 includes resistors R2 and R3, transistors Q21 to Q24 which are P-channel MOS transistors, and transistors Q25 and Q26 which are N-channel MOS transistors. The resistors R2 and R3 are connected in series between the power supply line 38 and the ground. The source of transistor Q21 is connected to the power supply line 38, and its drain is connected to the sources of transistors Q23 and Q24 via the transistor Q22. The drain of transistor Q23 is grounded through the transistor Q25, and the drain of transistor Q24 is grounded through the transistor Q26.

The gate of the transistor Q21 is connected to the gate of the transistor Q1 of the error amplifier 36 and the like, and the gate of the transistor Q22 is connected to the gate of the transistor Q2 of the error amplifier 36 and the like. A gate of the transistor Q23 serves as an output terminal for the common voltage VCOM and is connected to the node N5 of the error amplifier 36. The gate of transistor Q24 is connected to the node N6, which is the interconnection node of the resistors R2 and R3. The gates of the transistors Q25 and Q26 are commonly connected and connected to the gates of the transistors Q15 and Q17 of the error amplifier 36, respectively.

In this way, the common voltage generation unit 37 is configured to output the divided voltage obtained by dividing the power supply voltage VDD by the resistors R2 and R3 as the common voltage VCOM via the buffer configured by the transistors Q21 to Q26. By feeding back the common voltage VCOM output from the common voltage generation unit 37 to the error amplifier 36, the common mode level of the output of the error amplifier 14 is controlled to a desired level. As a specific configuration of the common voltage generation unit 15 of the on-timing generation circuit 10, a configuration similar to that of the common voltage generation unit 37 can be adopted.

According to the present embodiment described, the following effects can be obtained.

According to the above configuration, the on-timing generation circuit 10 generates the on-timing signal Sa by comparing a pair of the differential signals VC_P and VC_M, which are signals generated based on the forward phase ripple signal Vramp_P and the reverse phase ripple signal Vramp_M corresponding to the ripple voltage as the ripple component included in the output voltage VOUT, using the comparator 17.

In this way, it is possible to suppress the on-timing signal Sa from providing an erroneous on-timing due to the influence of the common mode noise and power supply noise when the input voltage VIN is relatively low, and the period during which the drive signal D for PWM control is at high level is longer than the period during which the drive signal D is at low level, that is, in the case of the high on duty ratio when the amplitude of each of the ripple signals Vramp_P and Vramp_M is relatively small, as shown in FIG. 6, in addition to when the input voltage VIN is relatively high, and the period during which the drive signal D for PWM control is at high level is shorter than the period during which the drive signal D is at low level, that is, in the case of the low on duty ratio when the amplitude of each of the ripple signals Vramp_P and Vramp_M is relatively large, as shown in FIG. 5.

Therefore, according to the above configuration, it is possible to improve resistance to the common mode noise and the power supply noise, that is, to greatly improve the S/N ratio of signals related to feedback of the output voltage VOUT. Therefore, according to the present embodiment, it is possible to obtain an excellent effect that the control of the output voltage VOUT can be stabilized even when the input voltage VIN is lowered. As a result, the switching power supply device 1 of the present embodiment can be applied to applications in which the range of the input voltage VIN is relatively wide, such as applications in which the voltage of an in-vehicle battery is used as the input voltage.

The on-timing generation circuit 10 AC-couples and injects a forward phase ripple signal Vramp_P and a reverse phase ripple signal Vramp_M into a signal obtained by biasing the output signal of the error amplifier 14 with a common voltage VCOM, thereby generating a pair of differential signals VC_P and VC_M. In this way, the differential signals VC_P and VC_M are signals that more accurately reflect the ripple component included in the output voltage VOUT, so that the accuracy of generating the on-timing signal Sa and the accuracy of controlling the output voltage VOUT are improved.

The on-state time generation circuit 11 is configured to include a capacitor 28 charged with a current proportional to the input voltage VIN, and a comparator 29 that generates the on-state time signal Sb by comparing the terminal voltage Vramp2 of the capacitor 28 and the output voltage VOUT. With such a configuration, the on-state time of the switching elements 2 and 3 varies depending on the input voltage VIN, and as a result, it is possible to suppress the variation of the switching frequency of the switching elements 2 and 3 depending on the input voltage VIN.

Second Embodiment

The second embodiment of the present disclosure is described with reference to FIGS. 7 to 9.

<Overall Configuration>

Figure 7:
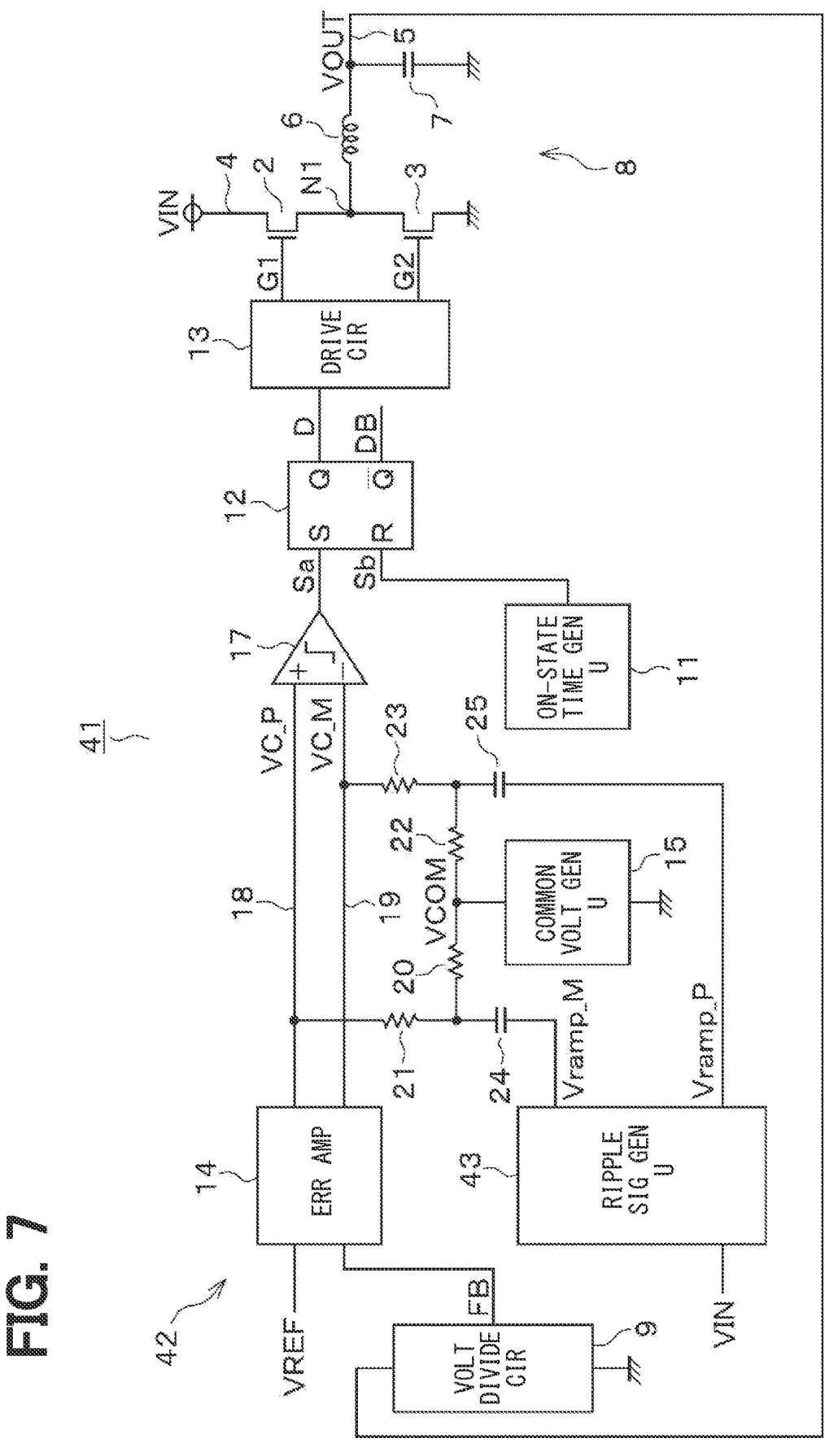
FIG. 7 is a diagram schematically showing the configuration of a switching power supply device according to a second embodiment.

As shown in FIG. 7, the switching power supply device 41 of the present embodiment includes an on-timing generation circuit 42 instead of the on-timing generation circuit 10 in contrast to the switching power supply device 1 of the first embodiment shown in FIG. 1. The on-timing generation circuit 42 differs from the on-timing generation circuit 10 in that it includes a ripple signal generation unit 43 instead of the ripple signal generation unit 16.

An input voltage VIN is input to the ripple signal generation unit 43. Based on the input voltage VIN, the ripple signal generation unit 43 pseudo-generates a forward phase ripple signal obtained by converting a voltage corresponding to the ripple voltage into a positive phase and a reverse phase ripple signal obtained by converting a voltage corresponding to the ripple voltage into a negative phase. Since the forward phase ripple signal and the reverse phase ripple signal pseudo generated by the ripple signal generation unit 43 are substantially the same signals as the forward phase ripple signal and the reverse phase ripple signal generated by the ripple signal generation unit 16, the same reference numerals are attached.

<Specific Configuration of Ripple Signal Generation Unit>

Figure 8:
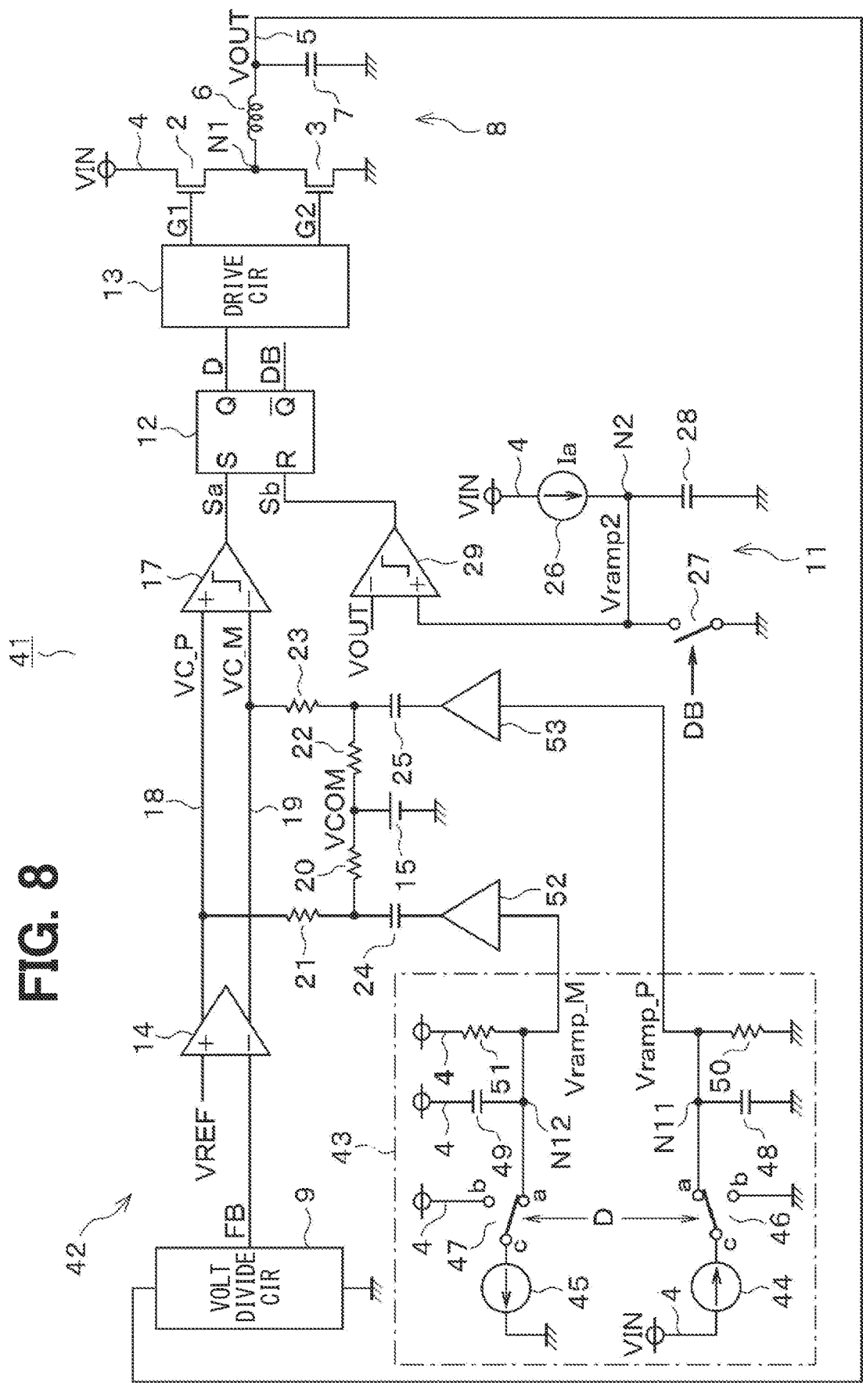
FIG. 8 is a diagram showing a specific configuration example of a ripple signal generation unit according to the second embodiment.

As a specific configuration of the ripple signal generation unit 43 of the on-timing generation circuit 42, for example, a configuration as shown in FIG. 8 can be adopted. In FIG. 8 and the like, the error amplifier 14 is represented by the symbol of amplifier, and the common voltage generation unit 15 is represented by the symbol of voltage source. As shown in FIG. 8, the ripple signal generation unit 43 includes current sources 44 and 45, switches 46 and 47, capacitors 48 and 49, resistors 50 and 51, and buffers 52 and 53.

The current sources 44 and 45 are constant current sources that provide constant current. The switches 46 and 47 are configured to switch the connection state between the common terminal c and the two switching terminals a and b according to the drive signal D. Specifically, the switches 46 and 47 are switched to the first state in which the common terminal c is connected to one switching terminal a while the drive signal D is at high level, and switched to the second state in which the common terminal c and the other switching terminal b are connected while the drive signal D is at low level.

The current source 44 is connected between the power supply line 4 and the common terminal c of the switch 46. One switching terminal a of the switch 46 is connected to the node N11, and the other switching terminal b is connected to the ground. The capacitor 48 is connected between the node N11 and the ground. A resistor 50 is connected between terminals of the capacitor 48, that is, between the node N11 and the ground.

The current source 45 is connected between the common terminal c of the switch 46 and the ground. One switching terminal a of the switch 46 is connected to the node N12, and the other switching terminal b is connected to the power supply line 4. The capacitor 49 is connected between the node N12 and the power supply line 4. A resistor 51 is connected between terminals of the capacitor 49, that is, between the node N12 and the power supply line 4.

According to the above configuration, the capacitor 48 is charged by a current proportional to the input voltage VIN, that is, a current that increases or decreases depending on the input voltage VIN during the period in which the drive signal D is at the high level, that is, the period in which the switching element 2 is turned on. Further, the capacitor 48 is discharged through the resistor 50 during the period when the drive signal D is at low level, that is, during the period when the switching element 2 is turned off. In this manner, the capacitor 48 is charged with a current proportional to the input voltage VIN during the period corresponding to the on-state time during which the switching element 2 is in the on-state, and discharged during the period corresponding to the off time during which the switching element 2 is turned off, so that it functions as a forward phase capacitor.

According to the above configuration, the capacitor 49 is discharged by a current proportional to the input voltage VIN, that is, a current that increases or decreases depending on the input voltage VIN during the period in which the drive signal D is at the high level, that is, the period in which the switching element 2 is turned on. Further, the capacitor 49 is charged through the resistor 51 during the period when the drive signal D is at low level, that is, during the period when the switching element 2 is turned off. In this manner, the capacitor 49 is discharged with a current proportional to the input voltage VIN during the period corresponding to the on-state time during which the switching element 2 is in the on-state, and charged during the period corresponding to the off time during which the switching element 2 is turned off, so that it functions as a reverse phase capacitor.

In this case, the terminal voltage of the capacitor 48, that is, the voltage of the node N11 becomes the forward phase ripple signal Vramp_P. Further, in this case, the terminal voltage of the capacitor 49, that is, the voltage of the node N12 becomes the reverse phase ripple signal Vramp_M. Thus, the ripple signal generation unit 43 generates the forward phase ripple signal Vramp_P from the terminal voltage of the capacitor 48 and generates the reverse phase ripple signal Vramp_M from the terminal voltage of the capacitor 49.

In the above configuration, the output terminal of the ripple signal generation unit 43 for the reverse phase ripple signal Vramp_M is connected to the signal line 18 via the buffer 52, the capacitor 24 and the resistor 21. Further, in the above configuration, the output terminal of the forward phase ripple signal Vramp_P of the ripple signal generation unit 43 is connected to the signal line 19 via the buffer 53, the capacitor 25 and the resistor 23. The buffers 52 and 53 are configured to output a signal obtained by amplifying the input signal by a predetermined gain such as one.

<Specific Configuration for Generating Current Proportional to Input Voltage>

Figure 9:
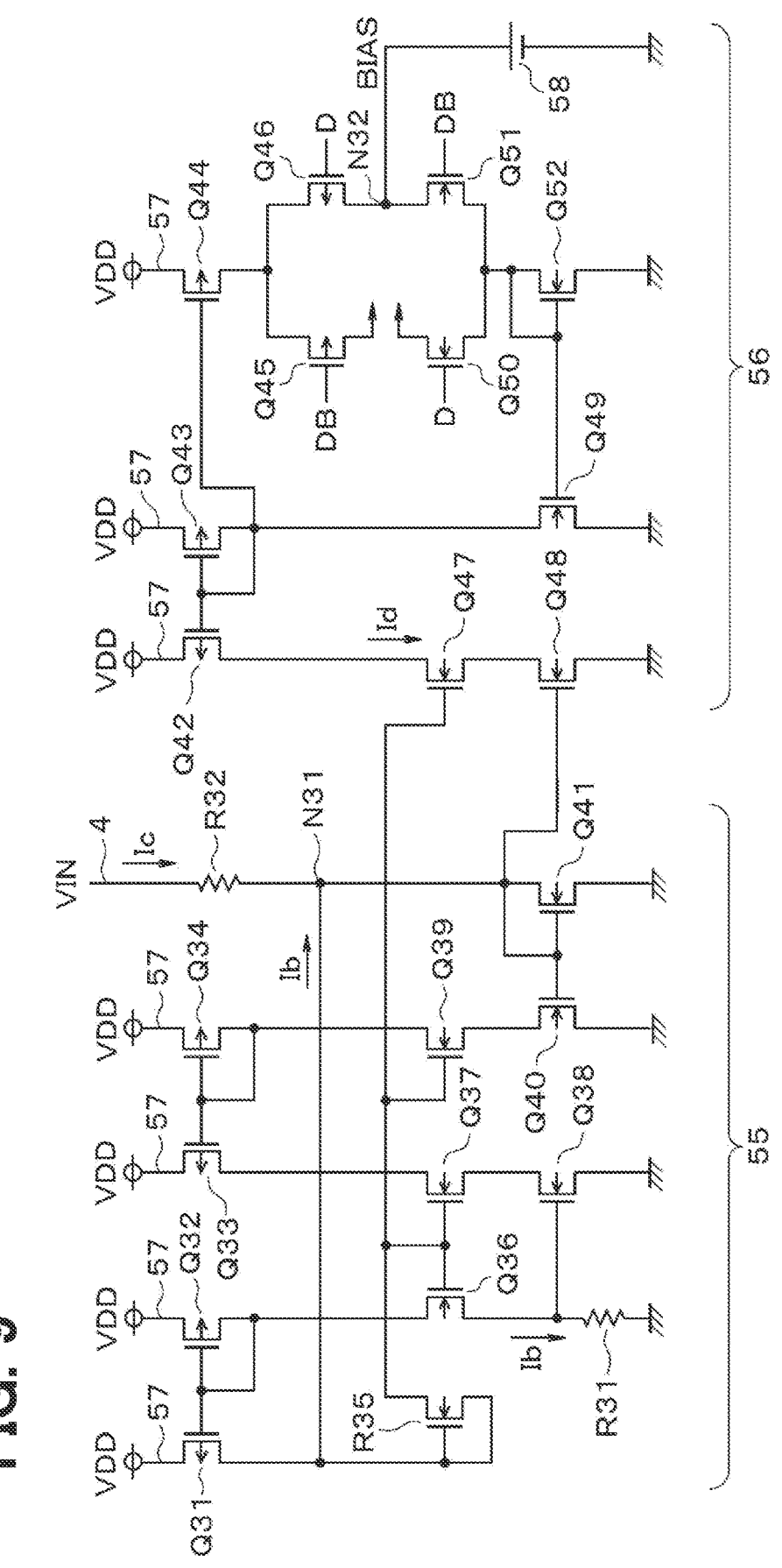
FIG. 9 is a diagram showing a specific configuration example for generating a current proportional to the input voltage according to the second embodiment.

As a specific configuration for generating the current proportional to the current sources 44 and 45, that is, the input voltage VIN, for example, a configuration as shown in FIG. 9 can be adopted. Here, the current of the current source 44 is referred to as forward phase pseudo-ripple current, and the current of the current source 45 is referred to as reverse phase pseudo-ripple current. As shown in FIG. 9, the dependent current generation unit 55 includes transistors Q31 to Q34 which are P-channel MOS transistors, transistors Q35 to Q41 which are N-channel MOS transistors, and resistors R31 and R32.

Each source of the transistors Q31 to Q34 is connected to a power supply line 57 to which a power supply voltage VDD such as +5V is applied. The transistors Q32 and Q34 are connected between their gates and drains, that is, are diode-connected. The gates of the transistors Q31 and Q32 are commonly connected, and the transistors Q31 and Q32 form a current mirror circuit. The gates of the transistors Q33 and Q34 are commonly connected, and the transistors Q33 and Q34 form a current mirror circuit.

The drain of the transistor Q31 is connected to the node N31. The transistor Q35 is an activation transistor, and its gate and source are connected. The gate of the transistor Q35 is connected to the node N31. The drain of the transistor Q32 is connected to the ground through the transistor Q36 and the resistor R31. The drain of the transistor Q33 is connected to the ground through the transistors Q37 and Q38. The gates of the transistors Q36 and Q37 are connected in common and connected to the drain of the transistor Q35. The gate of transistor Q38 is connected to the ground through the resistor R31.

The drain of transistor Q34 is connected to the ground through the transistors Q39 and Q40. The gate of the transistor Q39 is connected to the drain of the transistor Q35. The drain of the transistor Q41 is connected to the power supply line 4 through the resistor R32, and its source is connected to the ground. The transistor Q41 has a gate and a drain connected therebetween. That is, it is diode-connected. The gates of transistors Q40 and Q41 are commonly connected.

According to the above configuration, the current flowing from the transistor Q36 to the resistor R31 and the current flowing from the transistor Q31 to the node N31 become the current Ib represented by the following expression (1). Here, the gate-source voltage of the transistor Q41 or the like is defined as Vgs, and the resistance value of the resistor R31 is defined as Ra.

$$Ib=Vgs/Ra \tag{1}$$

Further, according to the above configuration, the current flowing from the power supply line 4 to the resistor R32 is the current Ic represented by the following expression (2). Here, the resistance value of the resistor R32 is defined as Rb.

$$Ic=(VIN-Vgs)/Rb \tag{2}$$

On the other hand, the ripple current generation unit 56 includes transistors Q42 to Q46 which are P-channel MOS transistors, transistors Q47 to Q52 which are N-channel MOS transistors, and a voltage source 58. Each source of the transistors Q42-Q44 is connected to the power supply line 57. The transistor Q43 has a gate and a drain connected therebetween. That is, it is diode-connected. The gates of the transistors Q42 and Q43 are commonly connected, and the transistors Q42 and Q43 form a current mirror circuit.

The drain of transistor Q42 is connected to the ground through the transistors Q47 and Q48. The drain of transistor Q43 is connected to the ground through the transistor Q49. The drain of transistor Q44 is connected to the sources of transistors Q45 and Q46. An inversion output signal DB is applied to the gate of the transistor Q45, and a non-inversion output signal D is applied to the gate of the transistor Q46. The drain of the transistor Q46 is connected to the drain of the transistor Q51.

A constant voltage BIAS generated by the voltage source 58 is applied to the node N32, which is the interconnection node of the transistors Q46 and Q51. The voltage BIAS is an intermediate voltage between the power supply voltage VDD and the ground. The sources of the transistors Q50 and Q51 are connected in common and connected to the drain of the transistor Q52. An non-inversion output signal D is applied to the gate of the transistor Q50, and a inversion output signal DB is applied to the gate of the transistor Q51. The transistor Q52 has a gate and a drain connected therebetween. That is, it is diode-connected. The gate of transistor Q52 is connected to the gate of the transistor Q49.

According to the above configuration, the current flowing from the transistor Q42 to the transistor Q47 is the sum of the current Ib and the current Ic, and is the current Id represented by the following expression (3). Here, the resistance values of the resistor R31 and the resistor R32 are the same resistance value R.

$$Id=VIN/R \tag{3}$$

Thus, according to the above configuration, it is possible to generate the current Id that is purely dependent on the input voltage VIN, from which the influence of the voltage Vt generated in the current mirror circuit, that is, the voltage Vgs is eliminated. In this case, the drain current of the transistor Q45 becomes the forward phase pseudo-ripple current, and the drain current of the transistor Q50 becomes the reverse phase pseudo-ripple current. Both the forward phase pseudo-ripple current and the reverse phase pseudo-ripple current depend on the input voltage VIN.

A forward phase ripple signal Vramp_P and a reverse phase ripple signal Vramp_M can be obtained by charging and discharging the capacitors 48 and 49 using such a forward phase pseudo ripple current and a reverse phase pseudo ripple current. In this case, the forward phase ripple signal Vramp_P and the reverse phase ripple signal Vramp_M are biased to a constant voltage BIAS when the non-inversion output signal D is at high level and the inversion output signal DB is at low level. The reason for doing so is as follows.

That is, if the forward phase ripple signal Vramp_P and the reverse phase ripple signal Vramp_M, which are ramp waves in the off state, are not biased to the voltage BIAS that is an intermediate voltage, the potential of each of the ripple signals Vramp_P and Vramp_M will not return to a constant voltage, and the potential at which the rising edge of the ramp wave is initiated in the next on timing changes. Then, the symmetry of the differential waveform between the forward phase ripple signal Vramp_P and the reverse phase ripple signal Vramp_M may be lost, and the accuracy of generating the on-timing signal Sa may decrease. As described above, by biasing the ripple signals Vramp_P and Vramp_M to the voltage BIAS in the off state, such difficulties can be prevented.

The present embodiment also provides the same effects as those of the first embodiment. Further, in the switching power supply device 41 of the present embodiment, the ripple signal generation unit 43 pseudo-generates the forward phase ripple signal Vramp_P and the reverse phase ripple signal Vramp_M as in the first embodiment based on the input voltage VIN. That is, the switching power supply device 41 employs a pseudo ripple injection method. In this way, it is possible to use a ceramic capacitor with a relatively low ESR as the capacitor 7 for smoothing the output voltage VOUT.

The ripple signal generation unit 43 includes a capacitor 48 that is charged with a current proportional to the input voltage VIN during the period corresponding to the on-state time and discharged during the period corresponding to the off time, and a capacitor 49 that is discharged with a current proportional to the input voltage VIN during the period corresponding to the on-state time and charged during the period corresponding to the off time. The terminal voltage of the capacitor 48 provides a forward phase ripple signal Vramp_P, and the terminal voltage of the capacitor 49 provides a reverse phase ripple signal Vramp_M.

In this manner, the pseudo forward phase ripple signal Vramp_P and the pseudo reverse phase ripple signal Vramp_M equivalent to the forward phase ripple signal Vramp_P and the reverse phase ripple signal Vramp_M generated based on the feedback voltage FB of the output voltage VOUT can be generated with high accuracy. Accordingly, in the above configuration, the differential signals VC_P and VC_M are signals that more accurately reflect the ripple component included in the output voltage VOUT, so that the accuracy of generating the on-timing signal Sa and the accuracy of controlling the output voltage VOUT are improved.

Third Embodiment

A third embodiment will be described below with reference to FIG. 10.

Figure 10:
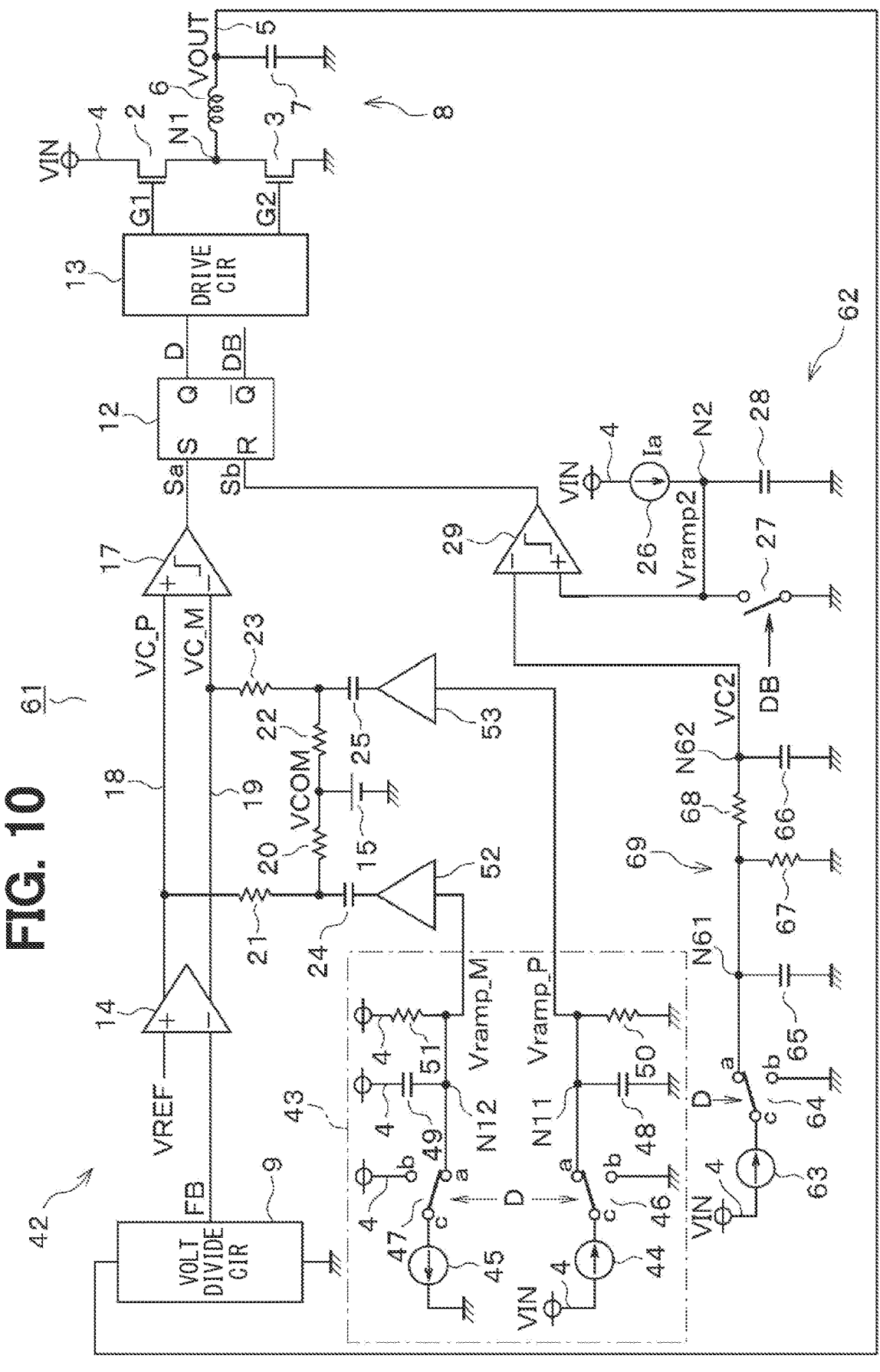
FIG. 10 is a diagram schematically showing the configuration of a switching power supply device according to a third embodiment.

As shown in FIG. 10, the switching power supply device 61 of the present embodiment includes an on-state time generation circuit 62 instead of the on-state time generation circuit 11 in contrast to the switching power supply device 41 of the second embodiment shown in FIG. 8. The on-state time generation unit circuit 62 differs from the on-state time generation unit circuit 11 in that a current source 63, a switch 64, capacitors 65 and 66, and resistors 67 and 68 are added.

The current source 63 is a constant current source that provides constant current. The switch 64 is configured to switch the connection state between the common terminal c and the two switching terminals a and b according to the drive signal D. Specifically, the switch 64 is switched to the first state in which the common terminal c is connected to one switching terminal a while the drive signal D is at high level, and switched to the second state in which the common terminal c and the other switching terminal b are connected while the drive signal D is at low level.

The current source 63 is connected between the power supply line 4 and the common terminal c of the switch 64. One switching terminal a of the switch 64 is connected to the node N61, and the other switching terminal b is connected to the ground. The capacitor 65 is connected between node N61 and the ground. A resistor 67 is connected between terminals of the capacitor 65, that is, between node N61 and the ground. A resistor 68 and a capacitor 66 are connected in series between the node N61 and the ground. A resistor 68 and a capacitor 66 form an RC filter circuit. The node N62 as the interconnection node of the resistor 678 and the capacitor 66 is connected to the inversion input terminal of the comparator 29.

According to the above configuration, the capacitor 65 is charged by a current proportional to the input voltage VIN, that is, a current that increases or decreases depending on the input voltage VIN during the period in which the drive signal D is at the high level, that is, the period in which the switching element 2 is turned on. Further, the capacitor 65 is discharged through the resistor 67 during the period when the drive signal D is at low level, that is, during the period when the switching element 2 is turned off. In this manner, the capacitor 65 is charged with a current proportional to the input voltage VIN during the period corresponding to the on-state time during which the switching element 2 is in the on-state, and discharged during the period corresponding to the off time during which the switching element 2 is turned off, so that it functions as a second capacitor.

In the above configuration, the voltage VC2 at the node N62 is a voltage obtained by smoothing the terminal voltage of the capacitor 65 by an RC filter having the resistor 68 and the capacitor 66, and corresponds to an output proportional voltage proportional to output voltage VOUT. Thus, in the above configuration, the current source 63, the switch 64, the capacitors 65, 66, and the resistors 67, 68 provide the voltage generation circuit 69 that generates the voltage VC2, which is an output proportional voltage proportional to the output voltage VOUT. The voltage generation circuit 69 generates the voltage VC2 using the input voltage VIN and the drive signal D, which is the duty signal, without using the output voltage VOUT. In this case, the comparator 29 generates the on-state time signal Sb by comparing the voltage Vramp2 and the voltage VC2.

Therefore, according to the present embodiment, the same effects as in the second embodiment are attained. Further, in the switching power supply device 61 of the present embodiment, the on-state time generation circuit 62 includes the voltage generation circuit 69 that generates the voltage VC2 that is an output proportional voltage using the input voltage VIN and the drive signal D without using the output voltage VOUT. In the on-state time generation circuit 62, the voltage VC2 is virtually regarded as the output voltage VOUT, and the comparator 29 compares the voltage Vramp2 and the voltage VC2 to generate the on-state time signal Sb. According-ing to such a configuration, it is possible to cancel the dependency of the switching frequency on the load current, which is caused by the voltage drop due to the resistance component generated in the switching elements 2, 3, the inductor 6, and the like.

Fourth Embodiment

A fourth embodiment will be described below with reference to FIG. 11.

Figure 11:
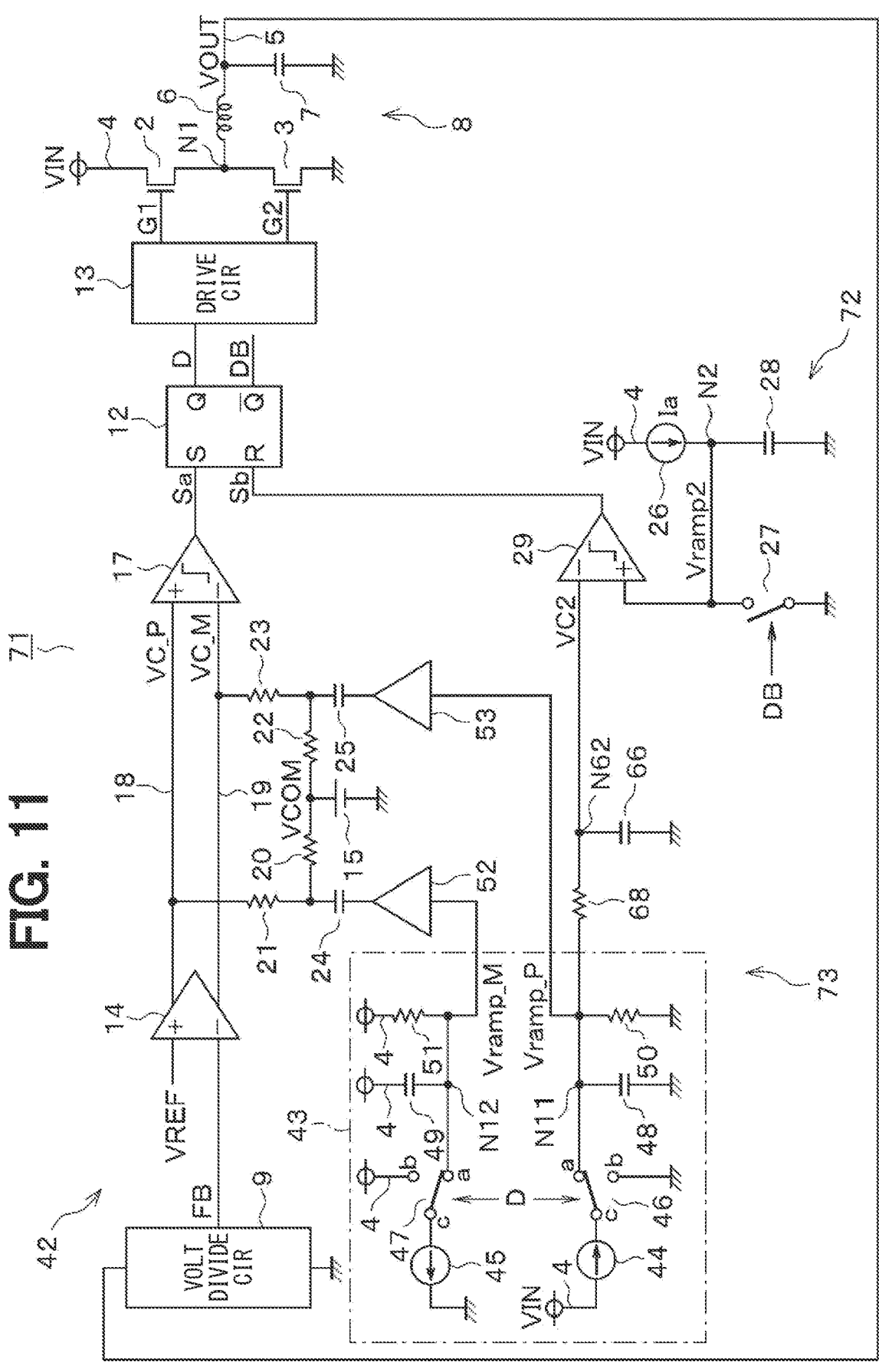
FIG. 11 is a diagram schematically showing the configuration of a switching power supply device according to a fourth embodiment.

As shown in FIG. 11, the switching power supply device 71 of the present embodiment includes an on-state time generation circuit 72 instead of the on-state time generation circuit 62 in contrast to the switching power supply device 61 of the third embodiment shown in FIG. 10. The on-state time generation unit circuit 72 differs from the on-state time generation unit circuit 62 in that a current source 63, a switch 64, a capacitors 65 and a resistor 67 are removed.

In this case, a series circuit of the resistor 68 and the capacitor 66 is connected between the node N11 of the ripple signal generation unit 43 and the ground. The current source 44, the switch 46, the capacitor 48 and the resistor 50 included in the ripple signal generation unit 43 constitute a circuit similar to the current source 63, the switch 64, the capacitor 65 and the resistor 67 in the on-state time generation circuit 62. Therefore, in the above configuration, the current source 44, the switch 46, the capacitor 48, and the resistor 50 included in the ripple signal generation unit 43 function in the same manner as the current source 63, the switch 64, the capacitor 65, and the resistor 67 in the on-state time generation circuit 62.

In this way, the on-state time generation circuit 72 can perform the same operation as the on-state time generation circuit 62 by sharing a part of the configuration of the ripple signal generation unit 43. That is, the on-state time generation circuit 72 is configured by sharing the current source 44 as the current source 63, the switch 46 as the switch 64, the capacitor 48 as the capacitor 65 corresponding to the second capacitor, and the resistor 50 as the resistor 67. In this case, the current source 44, the switch 46, the capacitor 48, the resistor 50, the capacitor 66 and the resistor 68 constitute a voltage generation circuit 73 that generates the voltage VC2.

Therefore, according to the present embodiment, the same effects as in the third embodiment are attained. In addition, in the switching power supply device 71 of the present embodiment, the on-state time generation circuit 72 shares the configuration of the ripple signal generation unit 43 for a part of the configuration thereof. In this way, the size of the circuit can be reduced by the shared configuration, and as a result, the size of the switching power supply device 71 can be reduced.

Other Embodiments

The present disclosure is not limited to the embodiments that have been described above and illustrated in the drawings, but can arbitrarily be modified, combined, or expanded without departing from the spirit of the present disclosure.

The numerical values and the like shown in the embodiments described above are examples, and are not limited to those examples.

The present disclosure is not limited to the switching power supply devices 1, 41, 61, and 71, which are synchronous rectification type step-down switching power supply devices, but can be applied to general switching power supply devices that have a switching element and convert an input voltage into a desired output voltage by controlling the drive of the switching element with the fixed on-state time in a pulse width modulation manner. For example, power stages as shown in FIGS. 12 to 14 can be used instead of the power stage 8 as the power stage of the switching power supply device.

Figure 12:
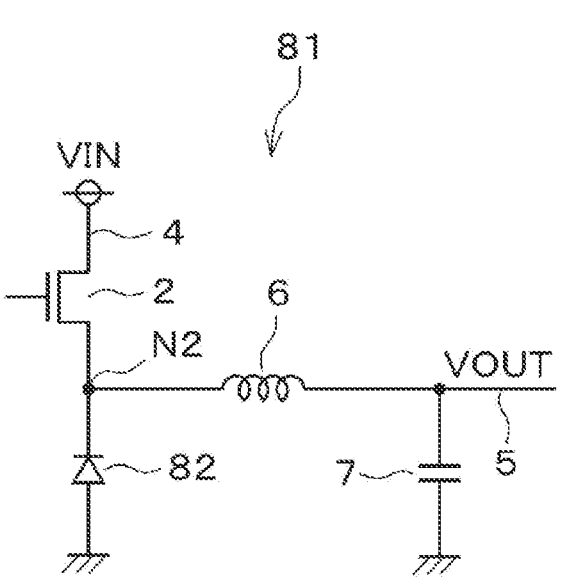
FIG. 12 is a first diagram schematically showing a modification example of the power stage.

A power stage 81 shown in FIG. 12 differs from the power stage 8 in that a diode 82 is provided instead of the switching element 3. The diode 82 has its cathode connected to the node N1 and its anode connected to the ground. Such a power stage 81 is used in a diode rectification step-down switching power supply device.

Figure 13:
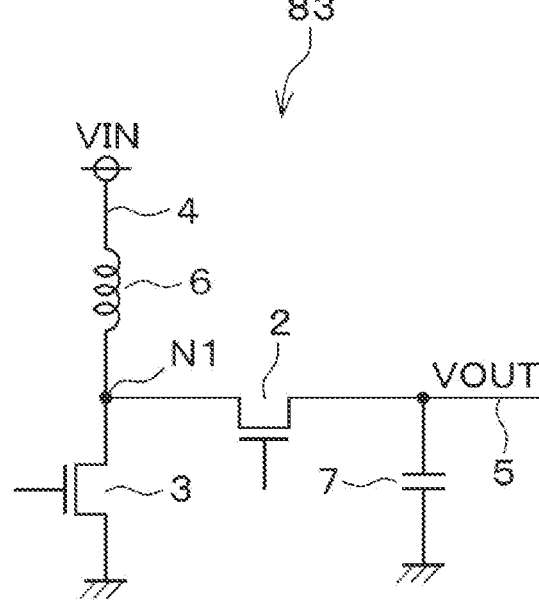
FIG. 13 is a second diagram schematically showing a modification example of the power stage.

A power stage 83 shown in FIG. 13 differs from the power stage 8 in that the connection position of the switching element 2 and the inductor 6 is opposite. In this case, the inductor 6 is connected between the power supply line 4 and the node N1, and the switching element 2 is connected between the node N1 and the power supply line 5. Such a power stage 83 is used in a synchronous rectification step-up switching power supply device.

Figure 14:
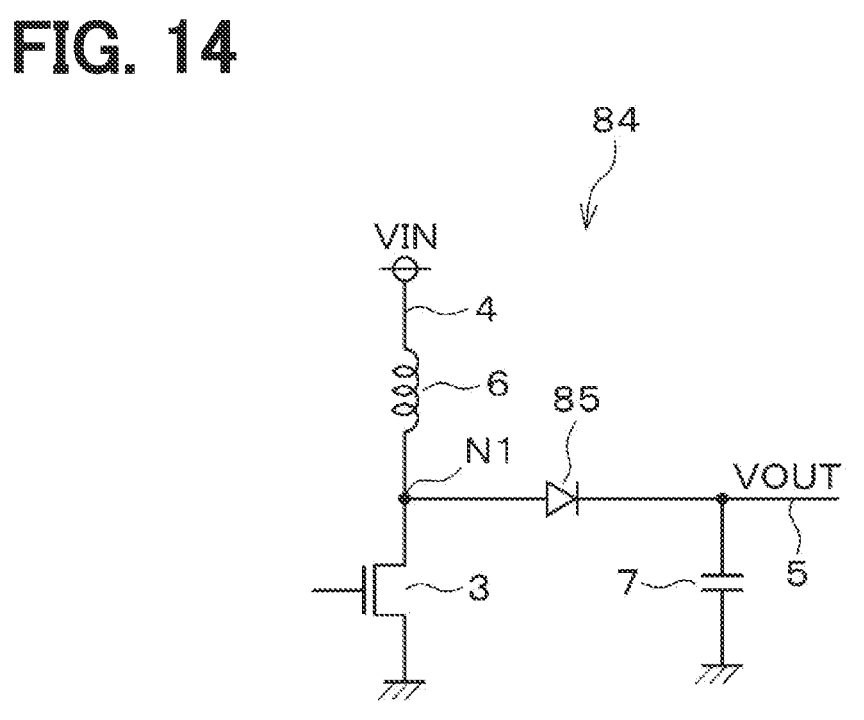

A power stage 84 shown in FIG. 14 differs from the power stage 83 in that a diode 85 is provided instead of the switching element 2. The diode 85 has its cathode connected to the node N1 and its anode connected to the power supply line 5. Such a power stage 84 is used in a diode rectification step-up switching power supply device.

Although the present disclosure has been described in accordance with the examples, it is understood that the present disclosure is not limited to such examples or structures. The present disclosure incorporates various modifications and variations within the scope of equivalents. In addition, various combinations and forms, and further, other combinations and forms including only one element, or more or less than these elements are also within the sprit and the scope of the present disclosure.

What is claimed is:

1. A switching power supply device for converting an input voltage to an output voltage by executing a pulse width modulation control for a drive of a switching element with a fixed on-state time, the switching power supply device comprising:

the switching element;

an on-timing generation circuit that generates an on-timing signal corresponding to an on-timing at which the switching element is turned on;

an on-state time generation circuit that generates an on-state time signal corresponding to an on-state time during which the switching element is in an on-state;

a drive signal generation circuit that generates a drive signal based on the on-timing signal and the on-state time signal; and a drive circuit that drives the switching element based on the drive signal, wherein:

the on-timing generation circuit includes:

a differential output type error amplifier that outputs an error amplification signal obtained by amplifying a difference between a feedback voltage corresponding to the output voltage and a reference voltage;

a common voltage generation unit that generates a common voltage;

a ripple signal generation unit that generates a forward phase ripple signal obtained by converting a voltage corresponding to a ripple voltage included in the output voltage into a forward phase and a reverse phase ripple signal obtained by converting the voltage corresponding to the ripple voltage into a reverse phase; and a first comparator that generates the on-timing signal by comparing a pair of differential signals generated based on the error amplification signal as an output signal of the error amplifier, the common voltage, the forward phase ripple signal and the reverse phase ripple signal.

2. The switching power supply device according to claim 1, wherein:

the ripple signal generation unit generates the forward phase ripple signal and the reverse phase ripple signal based on the input voltage.

3. The switching power supply device according to claim 2, wherein:

the ripple signal generation unit includes:

a forward phase capacitor that is charged with a current proportional to the input voltage during a period corresponding to the on-state time and discharged during a period corresponding to an off-state time during which the switching element is in an off-state; and a reverse phase capacitor that is discharged by the current proportional to the input voltage during the period corresponding to the on-state time and charged during the period corresponding to the off-state time; and the forward phase ripple signal is generated based on a terminal voltage of the forward phase capacitor, and the reverse phase ripple signal is generated based on a terminal voltage of the reverse phase capacitor.

4. The switching power supply device according to claim 1, wherein:

the on-timing generation circuit generates the differential signal by AC coupling and injecting the forward phase ripple signal and the reverse phase ripple signal into a signal obtained by biasing the output signal of the error amplifier with the common voltage.

5. The switching power supply device according to claim 1, wherein:

the on-state time generation circuit includes:

a capacitor that is charged by a current proportional to the input voltage; and a second comparator that generates the on-state time signal by comparing a terminal voltage of the capacitor and the output voltage.

6. The switching power supply device according to claim 3, wherein:

the on-state time generation circuit includes:

a first capacitor that is charged by a current proportional to the input voltage;

a voltage generation circuit that generates an output proportional voltage proportional to the output voltage based on a terminal voltage of a second capacitor that is charged with a current proportional to the input voltage during a period corresponding to the on-state time and discharged during a period corresponding to an off-state during which the switching element is in an off-state; and a second comparator that generates the on-state time signal by comparing a terminal voltage of the first capacitor and the output voltage; and the on-state time generation circuit commonly utilizes the forward phase capacitor of the ripple signal generation unit as at least the second capacitor.

\* \* \* \* \*